(12) United States Patent
Singhal

(10) Patent No.: US 9,456,066 B2
(45) Date of Patent: Sep. 27, 2016

(54) APPARATUS AND METHOD FOR A PROTECTIVE COVER AND GRIP FOR SMART PHONES AND TABLET COMPUTER DEVICES

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 301 days.

(21) Appl. No.: 13/789,355

(22) Filed: Mar. 7, 2013

(65) Prior Publication Data

US 2014/0252786 A1 Sep. 11, 2014
US 2016/0230929 A9 Aug. 11, 2016

Related U.S. Application Data

(60) Provisional application No. 61/725,482, filed on Nov. 13, 2012.

(51) Int. Cl.

| | |
|---|---|
| *A41D 19/00* | (2006.01) |
| *A61C 19/00* | (2006.01) |
| *A45F 3/14* | (2006.01) |
| *H04M 1/18* | (2006.01) |
| *H04B 1/3888* | (2015.01) |
| *A45F 5/00* | (2006.01) |
| *G06F 1/16* | (2006.01) |
| *H04B 1/3827* | (2015.01) |

(52) U.S. Cl.
CPC ............... *H04M 1/185* (2013.01); *A45F 5/00* (2013.01); *G06F 1/1626* (2013.01); *H04B 1/385* (2013.01); *H04B 1/3888* (2013.01); *A45F 2005/008* (2013.01); *A45F 2200/0516* (2013.01); *A45F 2200/0525* (2013.01); *G06F 2200/1633* (2013.01); *H04B 2001/3861* (2013.01)

(58) Field of Classification Search
CPC ........................................................ A45F 5/00
USPC ..................... 224/218, 217, 219; 24/571, 570
See application file for complete search history.

(56) References Cited

U.S. PATENT DOCUMENTS

| | | | | |
|---|---|---|---|---|
| 2,876,022 | A * | 3/1959 | Kroviak | B42F 9/001 108/43 |
| 5,360,108 | A * | 11/1994 | Alagia | H01H 9/0242 206/320 |
| 6,019,245 | A * | 2/2000 | Foster et al. | 220/739 |
| 6,991,829 | B2 * | 1/2006 | Bergman | 427/429 |
| 7,458,921 | B2 * | 12/2008 | Hallar | 482/106 |
| 7,468,909 | B2 * | 12/2008 | Yano et al. | 365/185.05 |
| 7,469,809 | B2 * | 12/2008 | Rodarte | A45F 5/00 224/218 |
| 8,509,865 | B1 * | 8/2013 | LaColla | H04M 1/04 455/556.1 |
| 8,561,862 | B2 * | 10/2013 | Foggiato | 224/217 |
| D693,350 | S * | 11/2013 | Mish | D14/440 |
| 8,616,423 | B2 * | 12/2013 | Wizikowski | A45F 5/00 224/218 |
| 8,706,176 | B1 * | 4/2014 | Jia | H04M 1/04 206/305 |
| 2006/0213940 | A1 * | 9/2006 | Chen et al. | 224/269 |
| 2008/0301974 | A1 * | 12/2008 | Bowen | A43B 3/166 36/7.6 |
| 2011/0016676 | A1 * | 1/2011 | Gray | B60P 7/0869 24/571 |
| 2012/0104059 | A1 * | 5/2012 | Yen | A45C 11/00 224/218 |

* cited by examiner

*Primary Examiner* — Justin Larson
*Assistant Examiner* — Lester L Vanterpool
(74) *Attorney, Agent, or Firm* — Steve Roeder, Esq.

(57) ABSTRACT

A protective cover for a handheld electronic device such as a smart phone and a tablet computer, with a display screen side, a backside, and surrounding edges has a set of u-shape clips attachable to the surrounding edges and are positioned on at least four corner edges of the device. A plurality of stretch fabric straps anchored to the set of clips and positioned across the backside of the device, wherein the clips and the straps function as a protective cover and handgrip for the device.

20 Claims, 12 Drawing Sheets

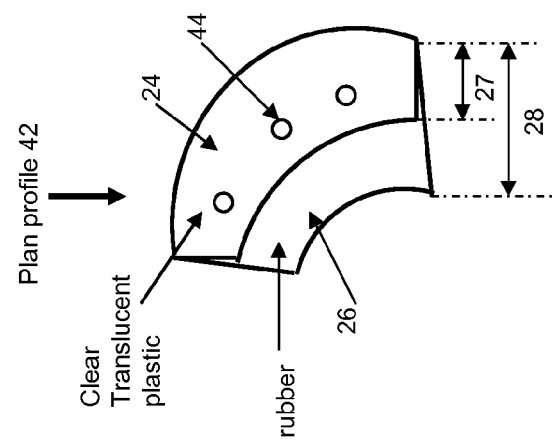
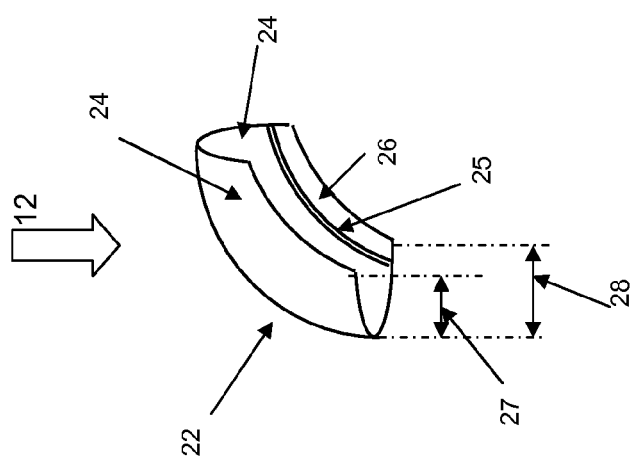
Figure 2A

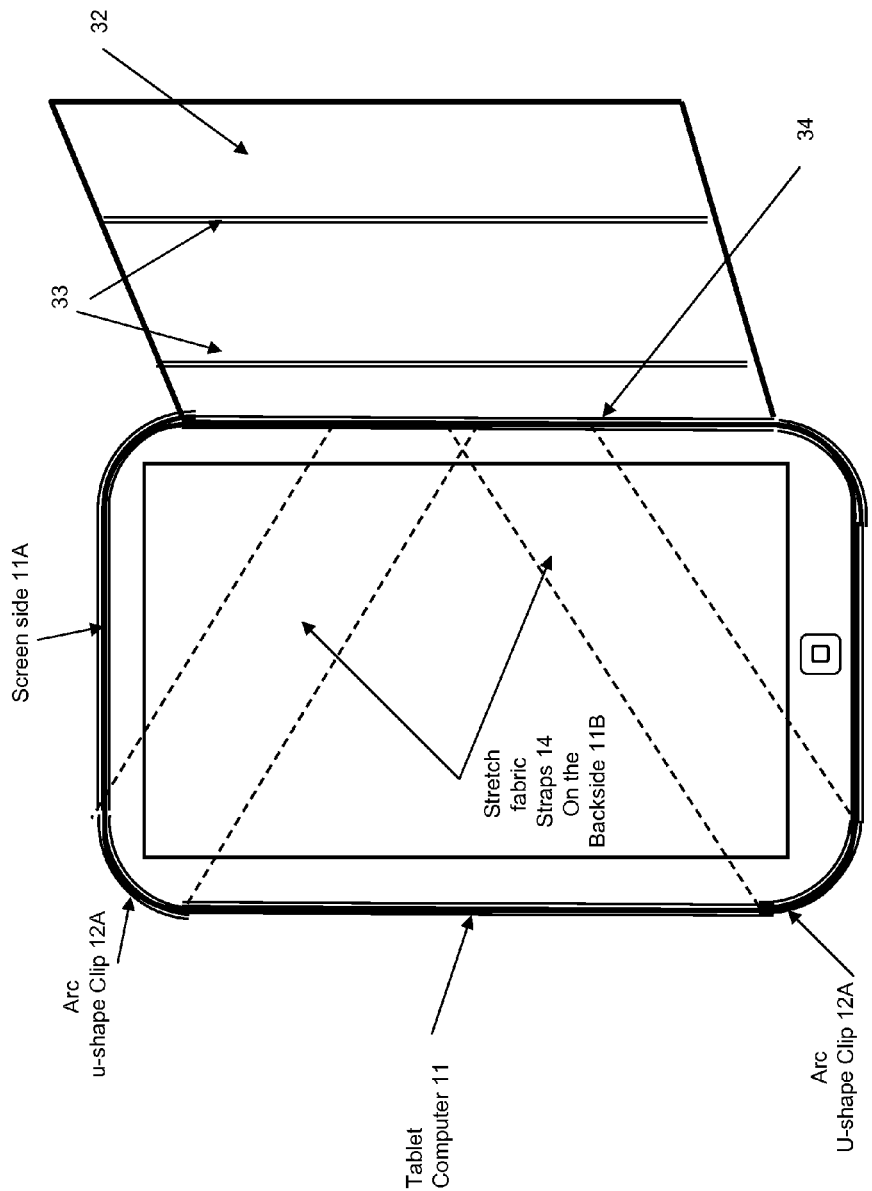

At step 100, having a set of u-shape clips that are attachable to the surrounding edges of a device and positioning them on at least four corner edges of the device.

At step 102, having a plurality of stretch fabric straps and anchoring them to the set of clips and positioning them across the backside of the device, wherein the clips and the straps function as a protective cover and handgrip for the device.

At step 104, having the set of four u-clips that are arc-shaped and attaching them to four corners of the device, and having two additional u-clips that are straight shape u-shape clips and attaching them to the two longer of the four edges of the device.

At step 106, having by the clips a front side, a back side and an external facing side, having by the external facing side a profile that matches the edge profile of the device.

At step 108, having openings on the backside of the clips for attaching stretch straps to the backside of the device.

At step 110, having on the front side of the clip a plurality of shock absorbing buttons and having on the backside of the clips a plurality shock absorbing protrusions, where the buttons and the protrusions providing shock absorbing mechanism to the device in case of fall of the device.

At step 112, having the stretch straps across the backside arranged in one of the configurations of (i) cross shape, (ii) star shape, and (iii) V-shape.

At step 114, having the straps are in v-shape and where the stretch straps enable an open hand with its fingers to be slid behind one of the strap and thus attach the tablet to the palm of the hand, without gripping the tablet and wherein the clips and the straps function as a protective cover against damage during a drop of the tablet.

At step 116, having two of the u-clips as arc-shaped and attach to two of the corners of the tablet, and one u-strap is straight and attaches to one side of the tablet.

At step 118, having the clips have a front side, a back side and a external facing side, where the external facing side has a profile that matches the edge profile of the tablet.

At step 120, having the backside of the clips have openings to attach the stretch straps to the backside of the tablet

Figure 8

APPARATUS AND METHOD FOR A
PROTECTIVE COVER AND GRIP FOR
SMART PHONES AND TABLET COMPUTER
DEVICES

CROSS REFERENCE

This application claims priority from provisional application Ser. No. 61/725,482 filed Nov. 13, 2012, titled "System and Method for a Protective Cover and a Hand Grip for a Tablet Computer" of Tara Chand Singhal. The application Ser. No. 61/725,482 is incorporated herein by reference.

FIELD OF THE INVENTION

A protective cover for electronic handheld devices such as smart phones and tablet computers has been described. The protective cover uses a set of arc u-shape clips at the corners of the smart phone and tablet that are anchored to stretch fabric straps at the backside of the smart phone and tablet computer devices.

BACKGROUND

There are hand-palm held smart phones. With the introduction of I Pad® mini and similar size devices from other manufacturers, there is now a new form-factor device in the form of a mini tablet computer. These new form factor tablet computing devices based on their size could be held in the hand or propped up on a table.

These tablet computing devices are designed neither for exclusively table top use nor exclusively hand-palm top use. Based on their sizes these devices are hybrid use devices that are suitable for use both as table top devices as well as hand-palm held devices. However, given their size and weight, such devices for some people may be uncomfortable to hold in the palm of the hand, for an extended period of time.

Hence, for these new tablet computer devices new forms of holding use is required that would enable them to be comfortably held in the hand during their use. The smart phones are changing in their sizes and come in different screen sizes. Industry provides for these smart phones and tablet computing devices protective cases that substantially increases the bulk and bulkiness of these devices.

It is an objective of the embodiments herein to provide for improved protective covers for these handheld devices, be they smart phones or handheld tablet computers that also improve their holding in the hand. Another objective is to have integrated holding and protective covers for these devices.

SUMMARY

Prior art provides protective cases for smart phones and tablet devices. These protective cases encase an entire device except the display screen. These protective cases, it is believed, add unnecessary bulk and weight to the device as well as hide the essential elegance and beauty of the device.

The embodiments described herein provide for a protective cover for smart phones and tablet computers that is believed is minimum that is required to protect these devices from accidental damage. These protective covers also help provide a grip to the cover for comfortably holding the device in the hand.

The embodiments described are based on minimizing the use of encasing material to a minimum and yet provide an effective protective cover. The protective covers described herein are based on using four arc-form u-shape clips that are positioned on the four arc-shaped corners of these devices. These clips are then anchored to each other by use of stretch fabric straps on the backside of the device.

The u-shape clips have features that minimize their size and provide for shock absorbing protrusions on the front side and the backside of these clips. The clips are anchored to each other across the backside of the device by stretch fabric straps. In some devices, additional u-shape clips in the middle of the long side of the device may also be added.

The combination of the u-shape clips and the stretch fabric straps in the protective cover of the embodiments described herein provide for protection to the device in the case of accidental fall and also provide for an easy grip.

These and other aspects of the embodiments herein are further described in detail with the help of the accompanying drawings and the description, where similar number are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 2A and 2B are block diagrams that illustrate features of the present embodiments of u-shape clips for use in protective cover and handgrip for handheld electronic devices such as tablet computer and smart phone.

FIG. 6 is a block diagram that illustrates features of the present embodiments of a protective cover and handgrip for a tablet computer along with a display screen cover.

FIG. 8 is a method diagram that illustrates features of a preferred embodiment for an integrated cover and hand grip cover for a tablet computer.

DESCRIPTION

Introduction

Figure 1B:
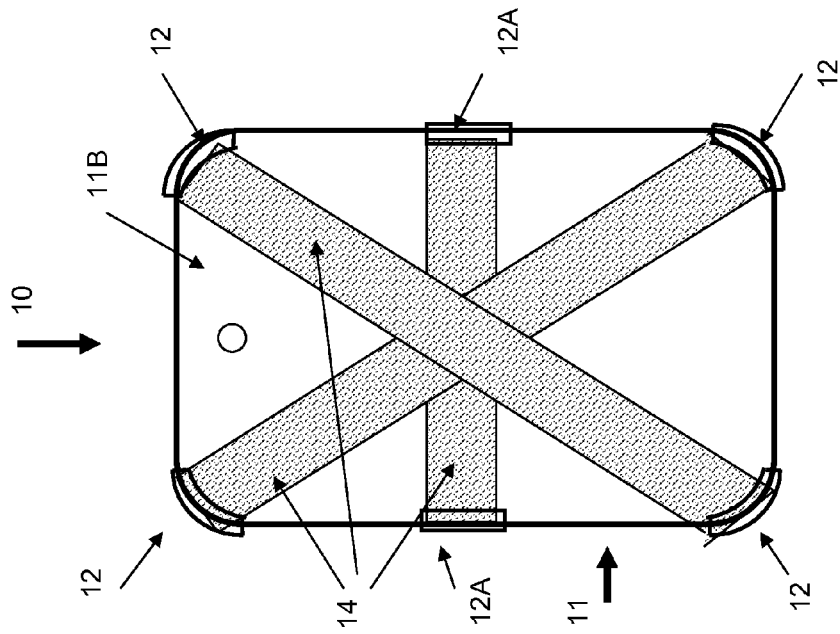
FIGS. 1A and 1B are block diagrams that illustrate features of the present embodiments of a protective cover and handgrip for handheld electronic devices such as a tablet computer and a smart phone.
Figure 1A:
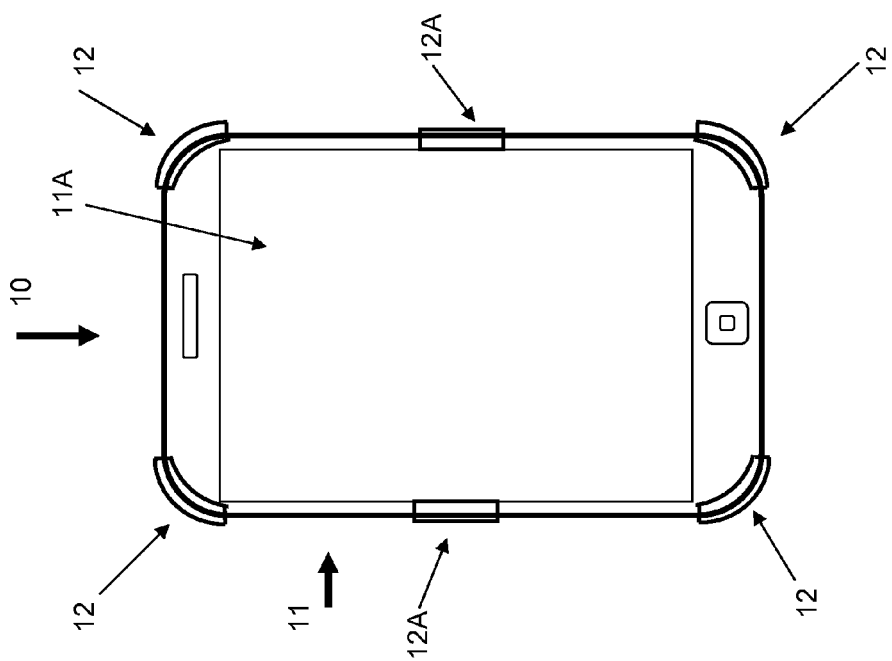

As illustrated with the help of FIGS. 1A and 1B, a smart phone or tablet computer like device 11 has a display side 11A and a backside 11B. As illustrated in these FIGS. 1A and 1B a protective cover 10 provides protection for the device 11 that may be used for both the smart phone and tablet computer like devices 11.

As illustrated in FIGS. 1A and 1B, the protective cover 10 has a set of u-shape clips 12. There is an arc-shape u-shape clip 12 that is used on the four corners of the device. There may also be a pair of straight u-shape clip 12A that may be used on the middle of the two long side of the device 11.

As shown in FIG. 1B, on the backside 11B of the device 11, the clips 12 are anchored to each other by stretch fabric straps 14 that stretch across the backside 11B of the device 11. The straps 14 may be arranged in a cross shape, a star shape or even a V-shape as illustrated later for different embodiments.

The straps 14 may be made of any suitable manmade material suitable for this purpose and may be around $1/16^{th}$ of an inch thick for the smart phone application and $1/8'$ thick for tablet computer application. The straps may be notionally ½ inch wide for the smart phones and up to one inch wide depending on the tablet size device. These are notional dimensions and actual thickness and width of these straps may be different then these dimensions.

The u-shape clips 12 have features that reduce the overall size and bulk of the protective cover 10 and it is believed thus enhance the appearance of the device 11. The clips 12 provide for an effective cushion via use of shock absorber buttons or protrusions on the outer side of these clips.

The preferred embodiment 10 described here is intended to provide a minimalist form that is also aesthetically pleasing. Other embodiments are not ruled out.

These and other features and embodiment are described herein in some detail where the headings are provided for reader convenience.

Clips 12

Figure 2B:
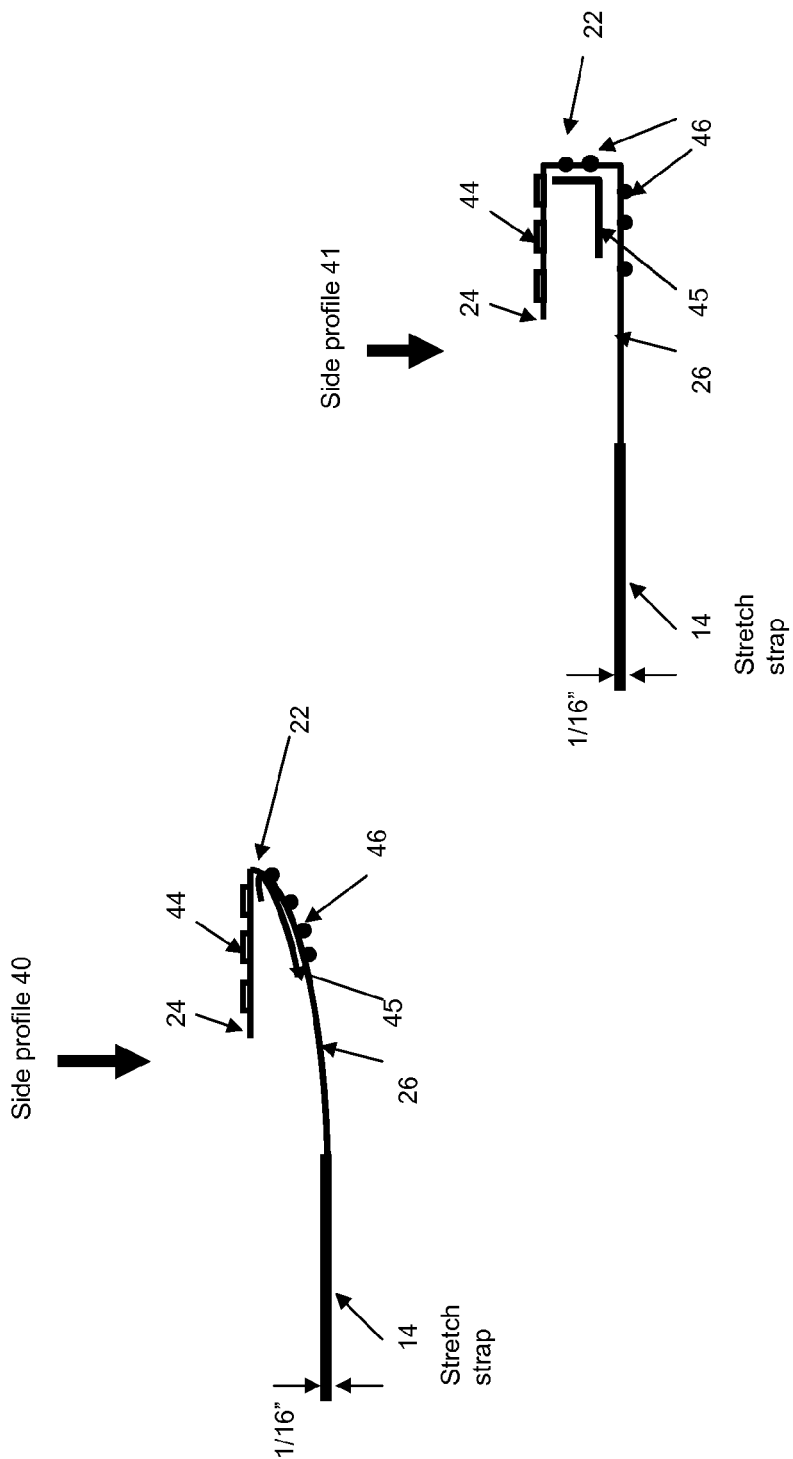

Further details of such clip 12 are described here with the help of perspective views in FIG. 2A and side views in FIG. 2B. As illustrated in FIG. 2A, clip 12 has a topside 24, a backside 22 and bottom side 26.

The features of clip 12 are that it is in the form of an arc-shape, a shape that would match the corners of the device 11 for being applied to the corners of the device 11. The device 12 has rounded corners.

The clip 12 has the width 27 of the topside 24 which is shorter than the width 28 of the bottom side 26. The width 27 is provided for being suitable for being on the topside 11A of the device 11, where the available area on the top side 11A of the device 11 is being set aside and used for display screen and controls. The width 28 of the clip 12 is used at the backside 11B of the device 11 which has more surface area to accommodate a larger width of the clip 12.

The bottom side 26 of clip 12 has an opening or other means 25 to anchor the stretch fabric strap 14. This attach means 25 for the strap 14 to the clip 12 may be in any number of forms, including being heat fused, or sewn or other anchor means that are not ruled out.

The material that may be used for clip 12 may be clear translucent plastic or it may be opaque plastic to match the color of the device 11. The material is made of resilient plastic that would deform under pressure and then resume its shape. Industry provides such plastic material for many applications.

The clip 12 is preferably made of a thin plastic such as $1/16^{th}$ inch thick or less and has features that provide shock absorbing means. As shown in the plan profile 42, the clip 12 has on the top side 24 multiple shock-absorbing buttons 44.

These shock absorbing buttons 44 are preferably hollow and cylindrical shape protrusions on the surface 24. There may be at least three or more such buttons. These buttons 44 are preferably ⅛" in diameter and 1/16" in height. The clip 12 and its various size features may be sized to the size and thickness of the device 11

As illustrated in FIG. 2B, side profile 40 and 41 of clip 12 are illustrated. Side profile 40 may be applicable for device 11 that have rounded edges and side profile 41 for devices 11 that have vertical or square edges.

As shown in side profile 40, there are shock-absorbing protrusions 46 on the bottom and side of the clip 12. As shown in side profile 41, there are also shock-absorbing protrusions 46 on the side and the bottom of the clip 12. As illustrated in the side profile 40 and 41, there are shock absorbing buttons 44 on the top side 24. The clip 12 may also have gel tape 45 on the inside of the clip 12.

As illustrated in the side profile 40 and 41, stretch fabric straps 14 are anchored to the bottom side 26 of the clip 12 via the opening 25.

The combination of the clips 12 on the corners of device 11 and the stretch fabric straps 14 on the backside 11B of device 11, of the protective cover 10 provide a protective cover to the device 11 to protect the device 11 on both sides 11A and 11B in the case of accidental fall as well as provide an easy grip for holding the device 11 in the human hand.

Stretch Straps 14

The straps 14 are made of a thick stretch fabric that could be rubber or a combination of woven fabric with rubber fibers. The technology of making such stretch straps is prior art and is used in many industries including sports and medical care industry.

The straps 14 may be one inch wide. It may be more or less than one inch wide, based on the size and weight of the tablet computer. For the Ipad® the straps may be 1 to 2 inch wide, whereas for mini Ipad® and the smart phone, the strap may be ½ inch to one inch wide. These are notional dimensions and may be different then these dimensions, however straps that are between ½ inch and 1 inch wide are preferred.

The straps 14 are anchored to the clips. In some embodiments the straps 14 may be anchored to the clips 12 at three places and in other embodiments at four corners and in some embodiments at six places to the clips depending upon different embodiments.

The position and diagonal orientation of the stretch straps is intended serve the purpose of providing a hand holding support at the back of the device without having to grip the device. A different or other layout and orientation of the stretch straps 14, including their material and thickness are possible and is not ruled out.

Tablet Computer Embodiment

With the introduction in the marketplace of new computing devices in the form of tablet computers in different size formats, new ways to be able to comfortably hold them in the hand during their use are required.

As illustrated with the help of FIGS. 3A, 3B, 4A and 4B, in a preferred embodiment there is a protective cover 10 for a tablet computer 11 that may also function as a handgrip for comfortably holding the tablet 11, without gripping the tablet 11, in the hand. The tablet computer has a display screen side 11A, a backside 11B, and surrounding edges that have clips 12.

Figure 3A:
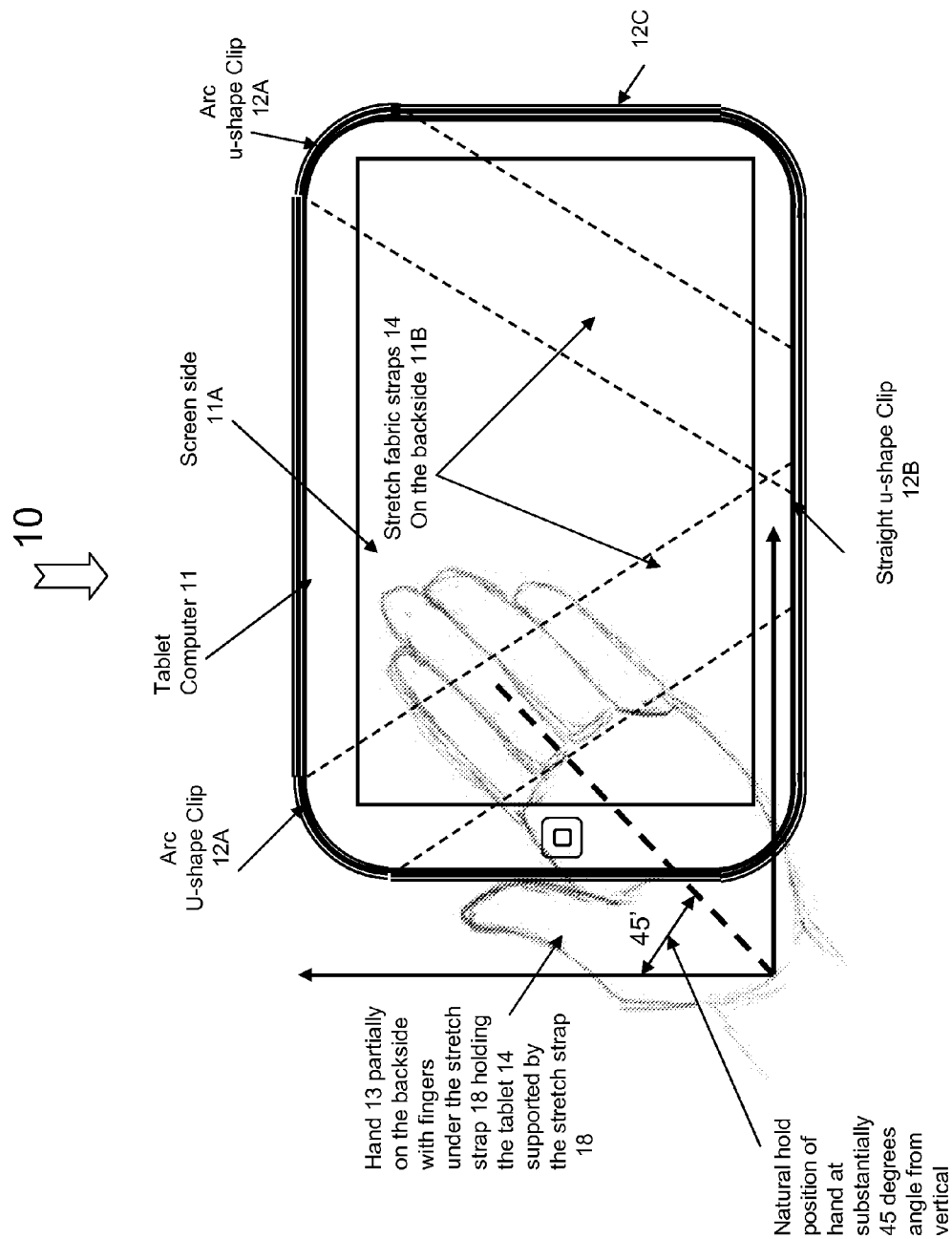
FIGS. 3A and 3B are block diagrams that illustrate features of the present embodiments of a protective cover and handgrip for a tablet computer held in a landscape orientation.
Figure 3B:
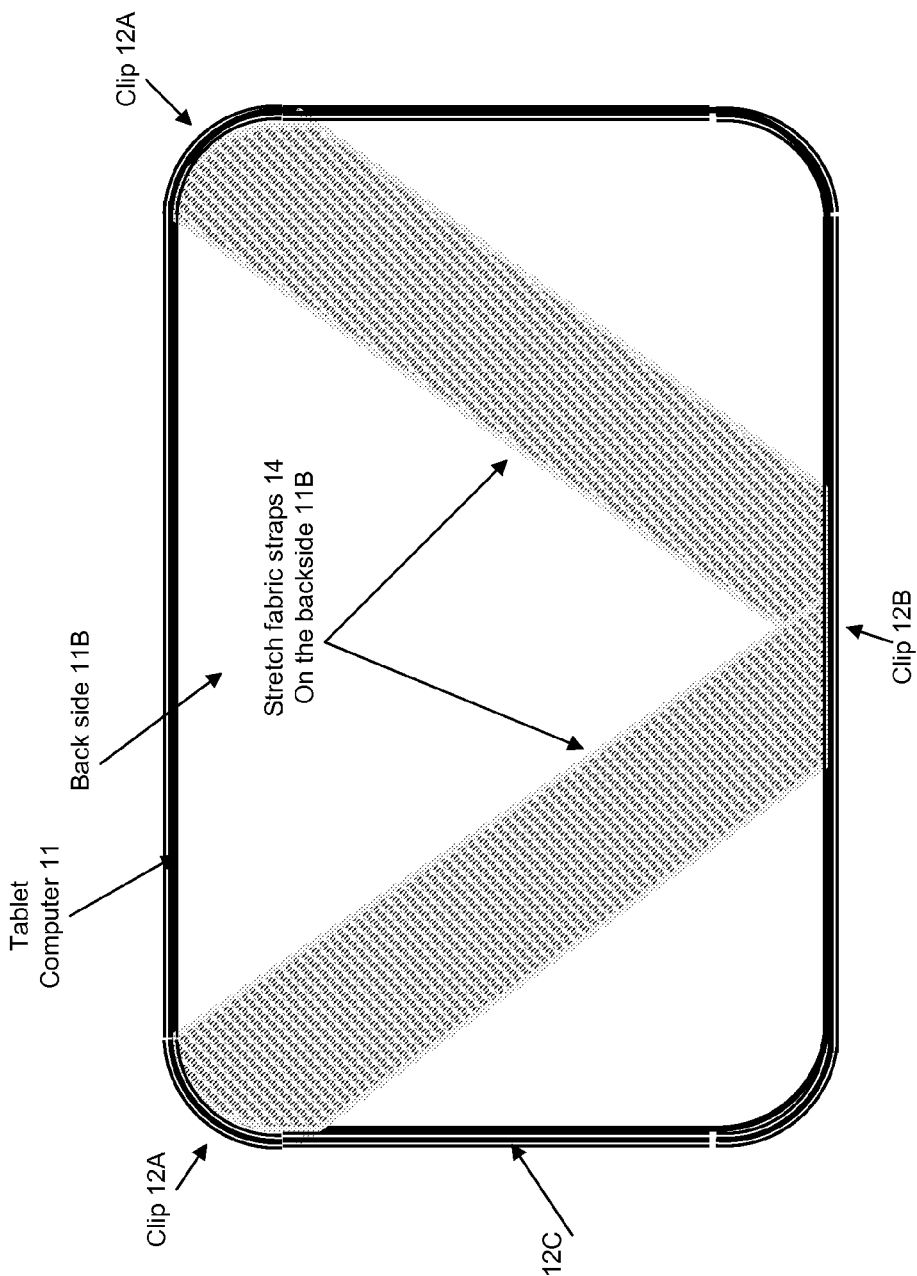

As illustrated in FIGS. 3A and 3B, the protective cover 10 has a set of u-shape clips 12A, 12B and 12C attachable to the surrounding edges of the tablet computer and these clips are positioned on the surrounding edges of the tablet computer. The protective cover 10 has two stretch straps 14 anchored to the set of clips and the stretch straps 14 are diagonally positioned on the backside 11B of the tablet 11.

Figure 4A:
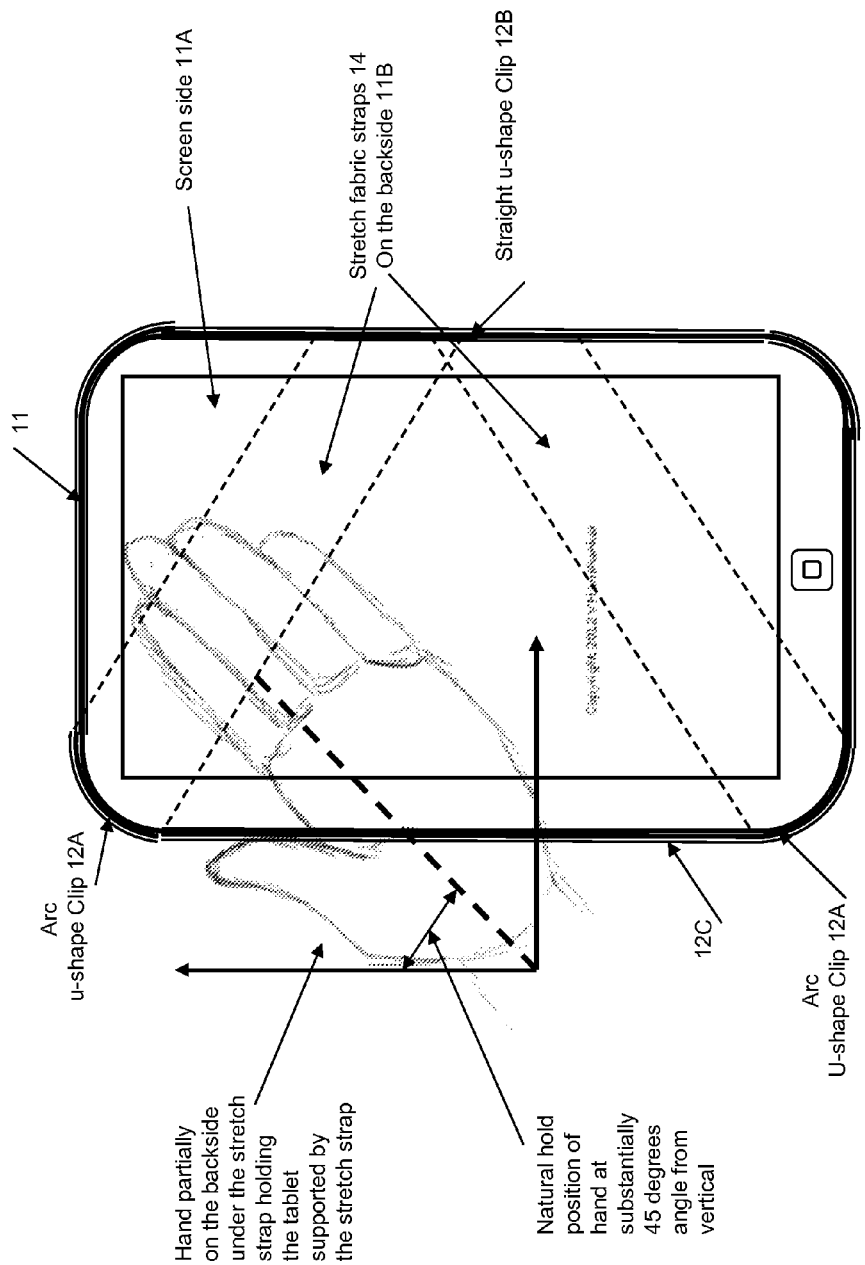
FIGS. 4A and 4B are block diagrams that illustrate features of the present embodiments of a protective cover and handgrip for a tablet computer held in a portrait orientation.

As illustrated in FIGS. 3A and 4A, the stretch straps 14 may enable an open hand 13 with its fingers to be slid behind one of the strap 14 and thus attach the tablet 11 to the palm of the hand 13, without gripping the tablet 11 and wherein the clips 12 and the straps 14 function as a protective cover against damage during an accidental drop of the tablet 11.

Figure 4B:
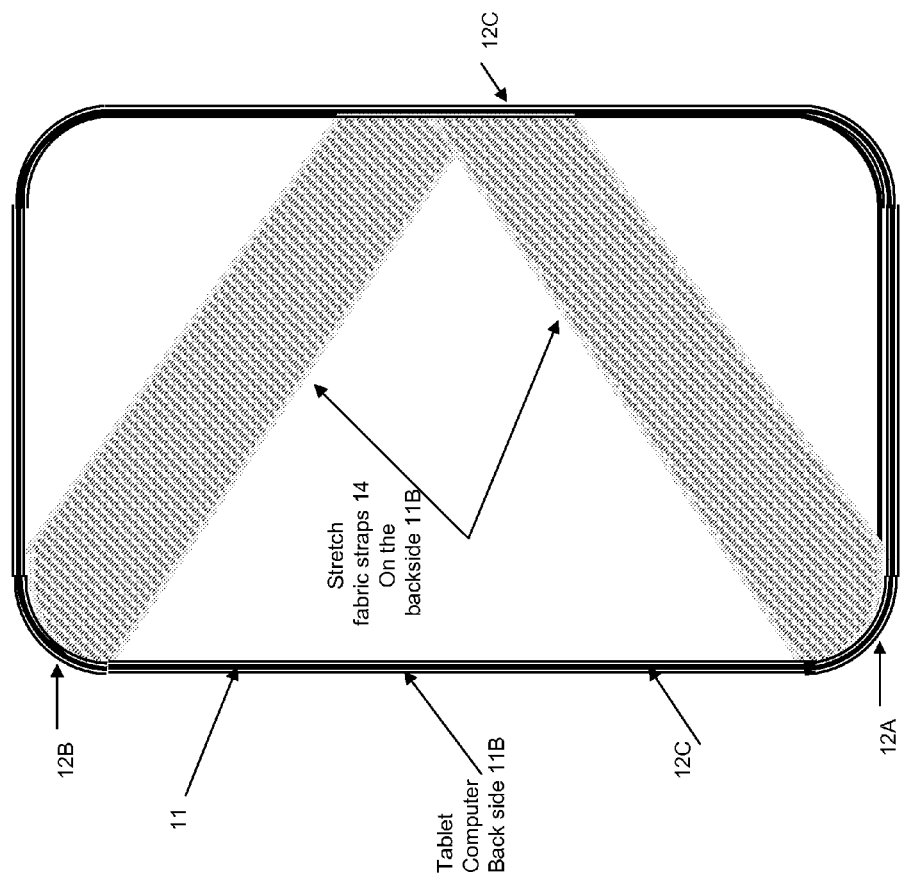

As illustrated with the help of FIGS. 4A and 4B, the same stretch straps 14 function for a left or a right hand as well as for holding the tablet in either a portrait or a landscape orientation of the tablet.

The orientation of the straps on the backside of the tablet takes into account the fact that for an open hand to be in a comfortable position relative to the arm and the body, the hand is at a roughly 45 degree angle from the vertical axis.

Figure 5:
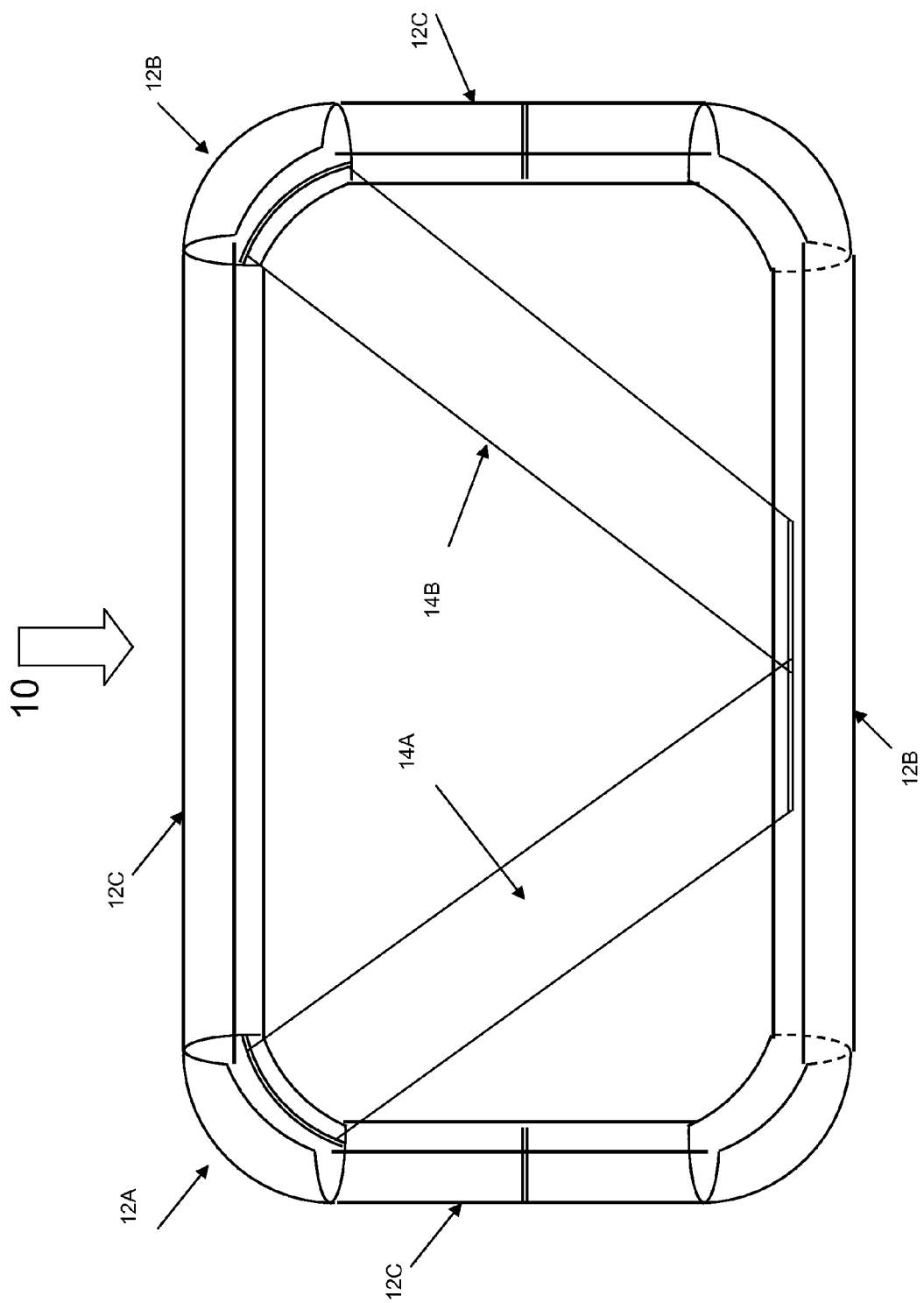
FIG. 5 is a block diagram that illustrates features of the present embodiments of a protective cover and handgrip for a tablet computer.

In the tablet embodiment, as illustrated with the help of FIG. 5, some of the u-shape clips are arc shaped and attach to the corners of the tablet, and some clips are straight line u-shape clips that attaches to the straight sides of the tablet.

As had been illustrated earlier with the help of FIGS. 2A and 2B, the clips have a front side, a back side and an external facing side, where the external facing side has a profile that matches the edge profile of the tablet. The topside of the clips extend over the tablet by approximately and notionally ¼" of an inch while the back side of the clips extend to notionally ½" on the backside of the tablet. Some of these clips on the backsides of the clips have anchors or openings to attach the stretch straps to the clips and thus to the backside of the tablet.

The straps 14 are diagonally positioned on the backside 11B of the tablet 11 from two of the corners of the tablet to the middle of an opposing straight side of the tablet. The straps on the backside of the tablet enable the hand to be in natural orientation of holding the hand at substantially 45 degrees without aligning the hand to the edges of the tablet, while supporting the tablet either in landscape or a portrait orientation.

The cover 10 has a pair of arc u-shape clip 12A on the two corners of the tablet 11 that also anchor a pair of stretch straps 14 at the backside 11B of the tablet 11. The cover 10 also has a straight u-shape clip 12B on the opposing straight side of the tablet 11 that anchors the pair of stretch straps 14 at their other ends. The cover 10 also has straight u-shape clips 12C that are positioned on the remainder edges of the tablet 11. The cover 10 also has a pair of stretch straps 14 on the backside 11B of the tablet 11 as also shown in FIGS. 3B and 4B.

As illustrated with the help of FIG. 3A, a hand 13 that is used to hold the tablet 11 is shown. The orientation of the hand 13 relative to the tablet 11 is substantially at 45 degrees from vertical and the fingers of the hand are inserted inside in one of the stretch straps 14, while the thumb of the hand 13 touches the left edge of the tablet 11 thus providing a hand support for holding the tablet 11 without having to grip the tablet 11.

FIGS. 4A and 4B illustrate the same features as in FIGS. 3A and 3B, with the tablet 11 being held in a portrait orientation. In this portrait orientation the hand 13 is used to hold the tablet 11 using one of the stretch straps on the upper side of the tablet 11.

The pair of straps 14 would work equally well for a left hand or a right hand, in addition to different orientations of the tablet as illustrated above.

The clips 12A are in the shape of an arc with a u-cross section. The clip 12B and 12C are straight u-shape clips. The detail of these clips is further illustrated later with reference to FIG. 5.

As illustrated in FIG. 5, the cover 10 is shown with the three types of u-shape clips 12A, 12B and 12C along with the two stretch straps 14A and 14B arranged diagonally between these set of clips.

Each of the clips 12A, 12B and 12C has a u-shape cross section. As illustrated with the help of FIG. 2B, the u-shape cross section has an internal face design as well as an external face design that attaches to the edge of the tablet.

The clips 12A are in the shape of a quarter arcs and have strap anchors and are used for two of the corners of the tablet 11. The clip 12B has a straight edge with two arc edges and attaches to one of the side edges of the tablet 11 that is opposite the two corner edges where the clips 12A are positioned. Clips 12C fill in the edges where the clips 12A and 12B are not used.

FIGS. 2A and 2B illustrate more details of the clip 12. View 12 provides a perspective view of the clip 12. Side profile 40 and plans profile 41 and 42 of the clip 12 are also illustrated. The clip 12 has an edge 22 that is shaped to the edge contour of the tablet.

As illustrated in FIG. 2A, the underside 26 of the clip 12 is wider than the top side 24 of the clip 12. As illustrated the underside 26 of the clip 12 also has notch 25 to attach the stretch straps 14A and 14B.

The top surface 24 of the clip 12A is notionally ¼" wide 27 and bottom surface 26 of the clip is notionally ½" wide 28. The bottom surface 26 has a notch or anchor means 25 that is attached to a stretch strap 14A to the bottom surface 26.

The clips 12 are preferably made of translucent plastic that matches the color of the tablet. Such plastics are prior art and used in many industries. The bottom surface 26 is made of a thicker material than the top surface 24. The top surface 24 of the clips 12 is substantially ¹⁄₃₂" thick while the backside 26 is substantially ¹⁄₁₆" thick. The straps 14 are also substantially ¹⁄₁₆" thick.

The straps 14 are notionally of ⅛" thickness or less. The top surface 24 of the clip 12A has positioned on them a few circular disk shape protrusions 44. These protrusions 44 are notionally ¹⁄₁₆" high and ⅛" diameter and are intended to provide a cushion against accidental fall damage to the tablet 11.

As had been illustrated in FIG. 2B, the bottom side 26 of the clips 12A and 12B at the far end of the clips 12 has many dot protrusions 46 that provide a cushion against accidental fall damage to the tablet 11.

Thus these clips 12A, 12B and 12C protect all four edges of the tablet and the display screen side 11B against the fall damage and the stretch straps additionally also protect against the damage on the backside 11B of the tablet.

When tablet 11 is accidentally dropped, one of the four edges is likely to absorb the brunt of the first impact force. Then other edges or surfaces of the tablet 11 absorb the secondary shock to the other edges and surfaces of tablet 11.

These clips 12A, 12B and 12C have been designed to protect the tablet while providing a minimalist design. The top surface 24 of the clip 12 is not only thinner but also less wide than the back surface 26 to provide an elegant and minimalist design to the cover 10 from the top of the tablet 11. The cylindrical projections 44 provide the impact cushion while the top side 24 provides a neat and clean appearance on the four edges of the tablet.

The backside 26 of the clip is contoured to the edge of the tablet and is also wider to provide attachment space for the straps 14.

As illustrated in FIG. 2B and side profile 40, alternatively, or in addition to the increased thickness of the backside 26 and protrusions 46 on the clip 12, a tape of impact gel 45 may be positioned inside the clip 12 as illustrated. The size of the impact gel tape may be about 10 cm wide and about 3 mm thick. These are notional dimensions and actual dimensions may be different then these dimensions of the gel tape 45.

Impact gel is a prior art technology that offers critical protection moving shock, weight and heat laterally throughout the gel. There are many industrial applications of impact gel including smart phone cases. In the instance application, a tape of the impact gel tape is used inside the clip 12 and would provide a cushion that would laterally move the impact energy at the corners of the tablet 11. Thus the gel tap 45 is preferably used for the clips 12 positioned at the four corners of the tablet. The gel tape 45 may also used on all four sides of the protective cover 10 as well.

Smart Phone Embodiment

Smart phone cover 10 is illustrated with the help of FIGS. 7A, 7B, 7C and 7D. A smart phone embodiment protective cover 10 has many of the same features as had been described above with the help of Tablet Embodiment in FIGS. 3 and 4.

Figure 7B:
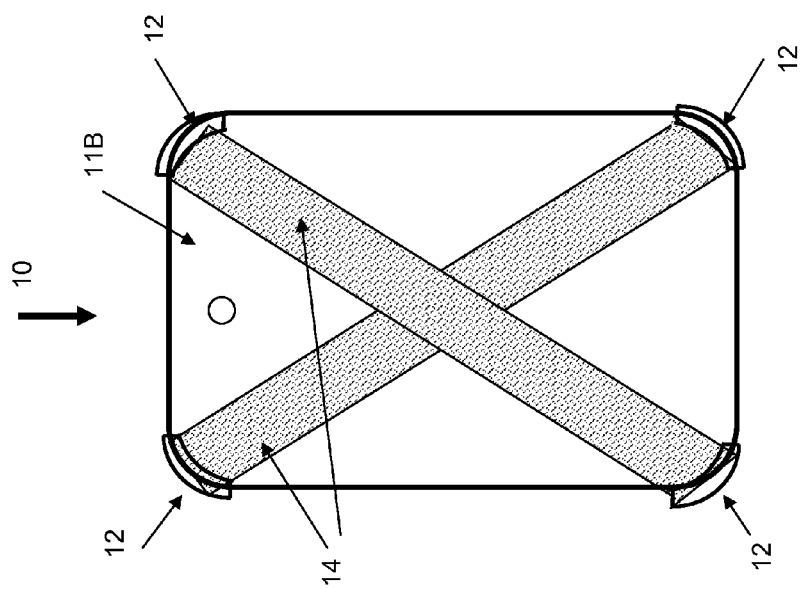
FIGS. 7A, 7B, 7C and 7D are block diagram that illustrates features of an alternative embodiment of a protective cover and grip for a smart phone.
Figure 7A:
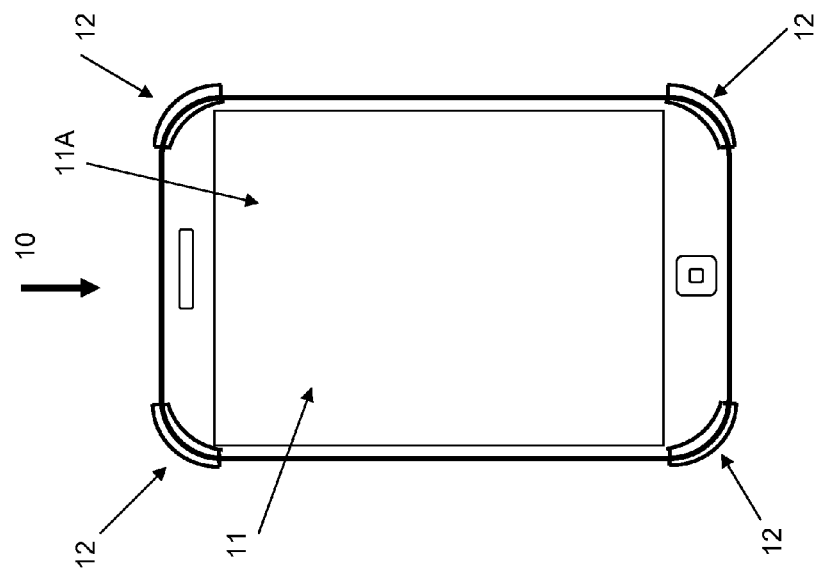
Figure 7D:
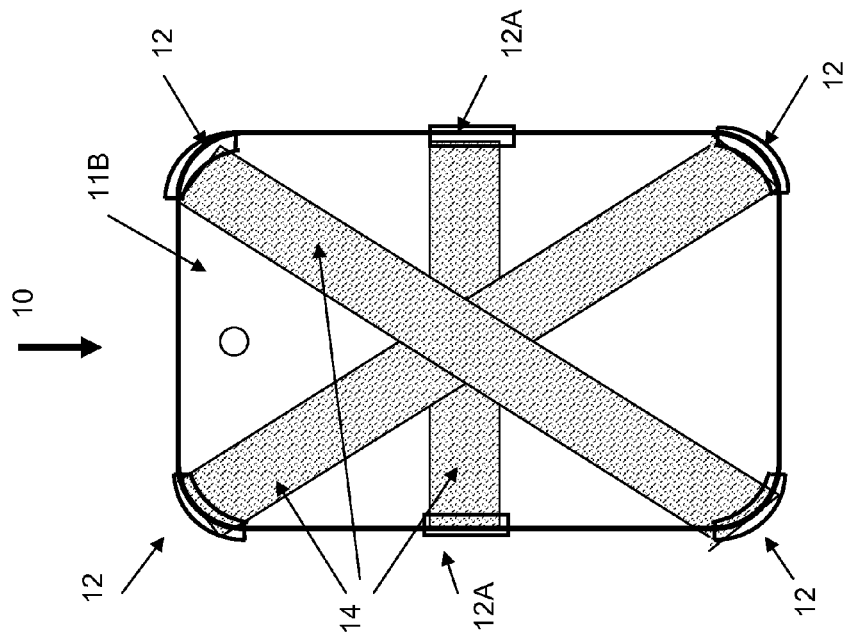
Figure 7C:
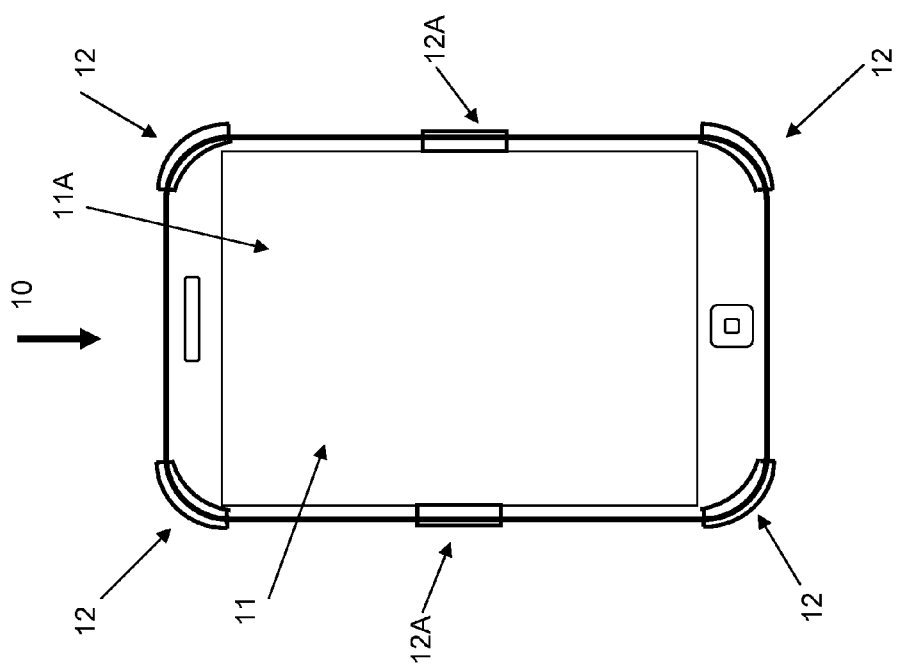

The embodiments for smart phones and in between devices have at least four arc u-shape clips as shown in FIGS. 7A and 7B. Alternatively smart phones may also have six clips as shown in FIGS. 7C and 7D.

The position of controls on the edges of the device 11 and cameras on backside of the device 11 may be in different locations based on make and model of these devices. Hence it should be understood by those skilled in the art, that the clips 12 and the straps 14 are suitably adjusted to accommodate these controls and the cameras and their flash or any other features that may be provided in the future.

Mode of Operation:

To install protective cover 10 to tablet 11, the clip 12B is positioned on the long edge and by stretching the straps 14; the clips 12A are put on the far two corner edges of the tablet. Then other clips 12C may be positioned on the remainder of the edges of the tablet. This provides for an easy assembly and removal of the cover 10 to the tablet. Alternatively the clips 12 may be in two parts 12A and 12B that attach to two halves of the tablet 11.

The tablet is held in the hand and the fingers are slid under one of the straps and the thumb touching the edge of the tablet. Thus the cover 10 provides for a comfortable means to hold the tablet safely in the palm of the hand without having to grip the tablet.

Optionally, as illustrated in FIG. 6, for a tablet device, a screen cover 32 may be anchored 34 to the device 11 and where the screen cover 32 has folds 33 that enable the screen cover 32 to be folded when deployed and removed.

The mode of installation of cover 10 on a smart phone device requires at least two clips to be positioned on the corners and the strap 14 positioned on the backside and stretched to anchor the remainder of the clips around the smart phone. The same mode may be used to remove the cover 10.

A protective cover for a handheld electronic device such as a smart phone and a tablet computer, with a display screen side, a backside, and surrounding edges has a set of u-shape clips attachable to the surrounding edges and are positioned on at least four corner edges of the device. There are a plurality of stretch fabric straps anchored to the set of u-shape clips and positioned across the backside of the device, wherein the clips and the straps function as a protective cover and handgrip for the device.

The set of u-clips are arc-shaped and attach to four corners of the device, and two additional u-clips are straight shape u-shape clips that attach to two longer of the four edges of the device.

The clips have a front side, a back side and an external facing side, where the external facing side has a profile that matches the edge profile of the device. The backside of the clips has openings to attach the stretch straps to the backside of the device.

The front side and the external facing side of the clips have a plurality of shock absorbing buttons and the backside of the clips have a plurality shock absorbing protrusions, wherein the buttons and the protrusions provide shock absorbing mechanism to the device in case of fall of the device.

The stretch straps across the backside may be arranged in one of the configurations of (i) cross shape, (ii) star shape, and (iii) V-shape.

The stretch straps when used for a tablet computer, enable an open hand with its fingers to be slid behind one of the strap and thus attach the tablet to the palm of the hand, without gripping the tablet and wherein the clips and the straps function as a protective cover against damage during a drop of the tablet.

The two of the u-clips are arc-shaped and attach to two of the corners of the tablet, and one u-strap is straight and attaches to one side of the tablet. The clips have a front side, a back side and an external facing side, where the external facing side has a profile that matches the edge profile of the tablet. The backside of the clips has means to attach the stretch straps to the backside of the tablet.

The straight clip extends the length of the side and the two corners and the straps combined with the three clips also functions as a protective cover for the tablet.

The straps are diagonally positioned on the backside that enable the hand to be in natural orientation of holding the hand at substantially 45 degrees without aligning to the edges of the tablet, while gripping the tablet either in landscape of portrait orientation.

The clips have protrusions to protect the tablet to cushion the fall while minimizing the bulk, weight, and sight of the clips on the surface or the tablet computer.

The top surface of the arc clips have buttons protrusions to provide a cushion against damage from an accidental fall. The back surface of the arc clip has dot protrusions to provide a cushion against damage from an accidental fall.

A protective cover for a smart phone device has a set of U-clips, wherein each clip has a top side, a bottom side, an outward facing side, and an inward facing side. Each clip on the topside and the outward facing side has shock absorbing bubbles. The inward facing side of the clips matches the profile of an edge of the smart phone device and the clips are placed on the edges of the device and are connected across a backside of the device with stretch fabric straps.

In some embodiment, there are a set of six U-clips, four U-clips for each of the four corners and two U-clips for two longer sides of the smart phone device.

Method of Operation

As illustrated in FIG. 8, a method for a protective cover and hand grip cover for use with a tablet computer has the following steps where all the steps may not be used or used in the order specified:

At step 100, having a set of u-shape clips that are attachable to the surrounding edges of a device and positioning them on at least four corner edges of the device.

At step 102, having a plurality of stretch fabric straps and anchoring them to the set of clips and positioning them across the backside of the device, wherein the clips and the straps function as a protective cover and handgrip for the device.

At step 104, having the set of four u-clips that are arc-shaped and attaching them to four corners of the device, and having two additional u-clips that are straight shape u-shape clips and attaching them to the two longer of the four edges of the device.

At step 106, having by the clips a front side, a back side and an external facing side, having by the external facing side a profile that matches the edge profile of the device.

At step 108, having openings on the backside of the clips for attaching stretch straps across the backside of the device.

At step 110, having on the front side of the clip a plurality of shock absorbing buttons and having on the backside of the clips a plurality shock absorbing protrusions, where the buttons and the protrusions providing shock absorbing mechanism to the device in case of fall of the device.

At step 112, having the stretch straps across the backside arranged in one of the configurations of (i) cross shape, (ii) star shape, and (iii) V-shape.

At step 114, having the straps are in v-shape and where the stretch straps enable an open hand with its fingers to be slid behind one of the strap and thus attach the tablet to the palm of the hand, without gripping the tablet and wherein the clips and the straps function as a protective cover against damage during a drop of the tablet.

At step 116, having two of the u-clips as arc-shaped and attach to two of the corners of the tablet, and one u-strap is straight and attaches to one side of the tablet.

At step 118, having the clips have a front side, a back side and an external facing side, where the external facing side has a profile that matches the edge profile of the tablet.

At step 120, having the backside of the clips have openings to attach the stretch straps to the backside of the tablet.

In summary, the preferred embodiments are on a protective cover 10 for a tablet computer or smart phone device 11 that may also function as a handgrip for comfortably holding the tablet in the hand is described.

In a tablet embodiment, the protective cover 10 has a set of three u-shape clips attachable to the surrounding edges of the tablet computer and these clips are positioned on the surrounding edges of the tablet computer. The protective cover has two stretch straps anchored to the set of clips and the stretch straps are diagonally positioned on the backside of the tablet.

The stretch straps enable an open hand with its fingers to be slid behind one of the strap and thus attach the tablet to the palm of the hand, without gripping the tablet and wherein the clips and the straps function as a protective cover against damage during a drop of the tablet.

In a smart phone embodiment, there may be either four clips or a set of six clips to be positioned around the edges of the smart phone. These clips are attached to each other by stretch straps on the backside of the smart phone While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A protective cover for a handheld electronic device such as a smart phone and a tablet computer, with a display screen side, a backside, and surrounding edges, comprising:
   a. a set of u-shape clips attachable to the surrounding edges and are positioned on at least four corner edges of the device, the clips have shock absorbing mechanisms on multiple sides, the shock absorbing mechanisms include a plurality of shock absorbing buttons and dot protrusions;
   b. a plurality of stretch fabric straps anchored to the set of clips and positioned across the backside of the device, the clips and the straps protect the device from damage in an accidental fall of the device.

2. The protective cover as in claim 1, comprising:
   the set of u-clips are arc-shaped and attach to four corners of the device, and two additional u-clips are straight shape u-shape clips that attach to two longer of the four edges of the device.

3. The protective cover as in claim 1, the clips comprising:
   a. the clips have a front side, a back side and an external facing side, where the external facing side has a profile that matches the edge profile of the device;
   b. the backside of the clips have openings to attach the stretch straps to the backside of the device.

4. The protective cover as in claim 3, comprising:
   the front side and the external facing side of the clips have a plurality of shock absorbing buttons and the backside of the clips have a plurality shock absorbing protrusions, wherein the buttons and the protrusions provide shock absorbing mechanism to the device in case of fall of the device.

5. The protective cover as in claim 1, comprising:
   the stretch straps across the backside are arranged in one of the configurations of (i) cross shape, (ii) star shape, and (iii) V-shape.

6. The protective cover as in claim 1, for a tablet computer, comprising:
   the stretch straps enable an open hand with its fingers to be slid behind one of the strap and thus attach the tablet to the palm of the hand, without gripping the tablet and wherein the clips and the straps function as a protective cover against damage during a drop of the tablet.

7. The protective cover as in claim 6, comprising:
   a. two of the u-clips are arc-shaped and attach to two of the corners of the tablet, and one u-clip is straight and attaches to one side of the tablet;
   b. the clips have a front side, a back side and a external facing side, where the external facing side has a profile that matches the edge profile of the tablet;
   c. the backside of the clips have openings to attach the stretch straps to the backside of the tablet.

8. The protective cover as in claim 7, comprising:
   the straight clip extends the length of the side and the two corners and the straps combined with the three clips also functions as a protective cover for the tablet.

9. The protective cover as in claim 7, comprising:
   the straps are diagonally positioned on the backside that enable the hand to be in natural orientation of holding the hand at substantially 45 degrees without aligning to the edges of the tablet, while gripping the tablet either in landscape or portrait orientation.

10. The protective cover as in claim 6, comprising:
    the clips have protrusions to protect the tablet to cushion the fall while minimizing the bulk, weight, and sight of the clips on the surface or the tablet computer.

11. The protective cover as in claim 7, comprising:
   a. the top surface of the arc clips have buttons protrusions to provide a cushion against damage from an accidental fall;
   b. the back surface of the arc clip has dot protrusions to provide a cushion against damage from an accidental fall.

12. A method for a protective cover for a handheld electronic device such as a smart phone and a tablet computer, with a display screen side, a backside, and surrounding edges, comprising the steps of:
   a. having a set of u-shape clips attachable to the surrounding edges and positioning them on at least four corner edges of the device, having by the clips shock absorbing mechanisms on multiple sides, including in the shock absorbing mechanisms a plurality of shock absorbing buttons and dot protrusions;
   b. having a plurality of stretch fabric straps and anchoring them to the set of clips and positioning them across the backside of the device, protecting the device from damage by the clips and straps in an accidental fall of the device.

13. The method for protective cover as in claim 12, comprising the steps of:
   having the set of four u-clips that are arc-shaped and attaching them to four corners of the device, and having two additional u-clips that are straight shape u-shape clips and attaching them to the two longer of the four edges of the device.

14. The method for the protective cover as in claim 12, the clips comprising the steps of:
   a. having by the clips a front side, a back side and an external facing side, having by the external facing side a profile that matches the edge profile of the device;
   b. having openings in the backside of the clips for attaching the stretch straps to the backside of the device.

15. The method for the protective cover as in claim 14, comprising the steps of:
   having on the front side of the clip, a plurality of shock absorbing buttons and having on the backside of the clips a plurality shock absorbing protrusions, where the buttons and the protrusions providing shock absorbing mechanism to the device in case of fall of the device.

16. The method for the protective cover as in claim 12, comprising:
   having the stretch straps across the backside arranged in one of the configurations of (i) cross shape, (ii) star shape, and (iii) V-shape.

17. The method for the protective cover as in claim 16, for a tablet computer, comprising the steps of:
   having the straps are in v-shape and where the stretch straps enable an open hand with its fingers to be slid behind one of the strap and thus attach the tablet to the palm of the hand, without gripping the tablet and wherein the clips and the straps function as a protective cover against damage during a drop of the tablet.

18. The method for the protective cover as in claim 17, comprising:
   a. having two of the u-clips as arc-shaped that attach to two of the corners of the tablet, and one u-strap is straight and attaches to one side of the tablet;
   b. having the clips have a front side, a back side and an external facing side, where the external facing side has a profile that matches the edge profile of the tablet;
   c. having the backside of the clips has openings to attach the stretch straps to the backside of the tablet.

19. A protective cover for a smart phone device comprising:
   a. a set of U-clips, wherein each of the clips has a top side, a bottom side, an outward facing side and an inward facing side;
   b. each clip on the topside and the outward facing side has shock absorbing bubbles, the shock absorbing bubbles include a plurality of shock absorbing buttons and dot protrusions;
   c. the inward facing side of the clips matches the profile of an edge of the smart phone device and the clips are placed on the edges of the device and are connected across a backside of the device with stretch fabric straps.

20. The protective cover for a smart phone device as in claim 19, comprising:
   there are a set of six U-clips, four U-clips for each of the four corners and two U-clips for two longer sides of the smart phone device.

* * * * *